No. 828,097. PATENTED AUG. 7, 1906.
L. G. DIX.
TRACTION ENGINE.
APPLICATION FILED FEB. 14, 1906.
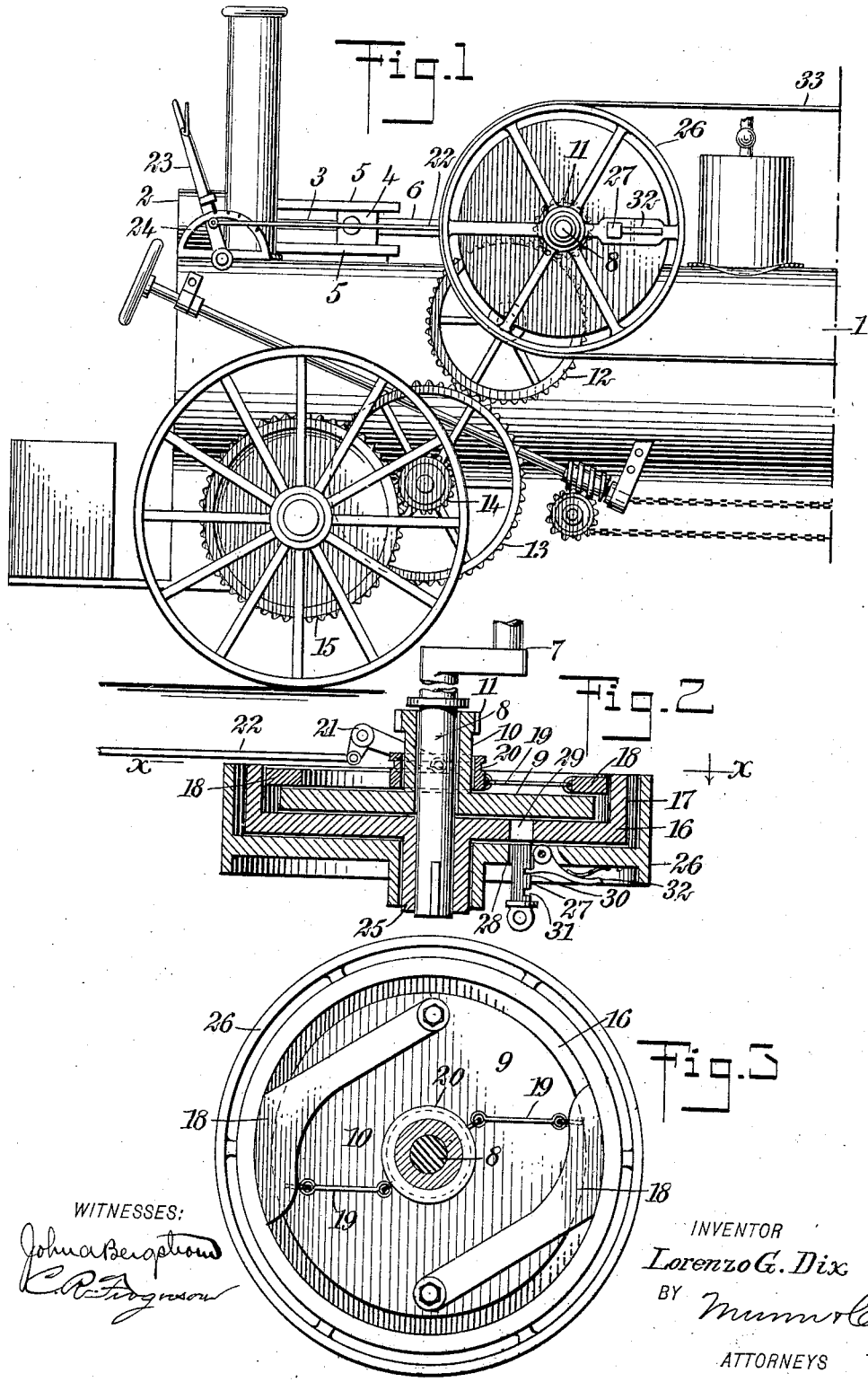
WITNESSES:
INVENTOR
Lorenzo G. Dix
BY Munn & Co.
ATTORNEYS

UNITED STATES PATENT OFFICE.

LORENZO G. DIX, OF HOOD RIVER, OREGON.

TRACTION-ENGINE.

No. 828,097.　　　Specification of Letters Patent.　　　Patented Aug. 7, 1906.

Application filed February 14, 1906. Serial No. 301,001.

*To all whom it may concern:*

Be it known that I, LORENZO G. DIX, a citizen of the United States, and a resident of Hood River, in the county of Wasco and State of Oregon, have invented a new and Improved Traction-Engine, of which the following is a full, clear, and exact description.

This invention relates to improvements in traction-engines, and more particularly to the belt-wheel thereon, the object being to provide a belt-wheel for operating a threshing-machine or the like, the parts being so arranged that the wheel may be locked to the driving-gear when the engine is stationary and operating a machine, or released and remain idle when the engine is traveling or moving into position for connection with a threshing-machine or the like.

I will describe a traction-engine embodying my invention and then point out the novel features in the appended claims.

Reference is to be had to the accompanying drawings, forming a part of this specification, in which similar characters of reference indicate corresponding parts in all the figures.

Figure 1 is a side elevation of a portion of a traction-engine with a belt-wheel embodying my invention thereon. Fig. 2 is a sectional view of a belt-wheel, and Fig. 3 is a section on the line *x x* of Fig. 2.

Referring to the drawings, 1 designates the boiler of a traction-engine, on which is a steam-cylinder 2, the piston therein having a rod connection 3 with a cross-head 4, operating in guides 5, and from this cross-head a rod 6 extends to a connection with the crank 7 on a crank-shaft 8.

Mounted loosely on the crank-shaft is a disk 9, provided with a sleeve 10, and on this sleeve is a pinion 11, meshing with a gear-wheel 12, which engages with another gear-wheel 13, on the shaft of which is a pinion 14, engaging with a gear-wheel 15, connected to one of the traction-engine wheels.

Rigidly connected to the shaft 8 and receiving the disk 9 is a friction clutch member 16, having an annular flange 17, designed to engage by friction-dogs 18, mounted to swing on the disk 9. The free ends of these friction-dogs 18 have link connection 19 with a collar 20, surrounding the shaft. The free ends of the friction-dogs extend in opposite directions, and the connections of the links with the collar 20 are diametrically opposite. The collar 20 is provided with an annular channel for receiving a pin on an angle-lever 21, from one arm of which the rod 22 extends forward to connection with a lever 23, having the usual pawl for engaging in a notch of a segment-rack 24.

Mounted loosely on the hub 25 of the clutch member 16 is a belt-wheel 26, having a flange surrounding the flange of the clutch member 16. As a means for locking the belt-wheel to the member 16 I employ a pin 27, movable through an opening 28 in the web of the belt-wheel and adapted to pass into an opening 29 in the clutch member 16. The pin 27 is provided with notches 30 31, in either one of which the end of a spring-pressed dog 32 is designed to engage—that is, by engaging the end of the dog in the notch 30 the said pin will be held out of engagement with the clutch member 16, but when the pin is moved inward or into the opening 29 the end of the dog is to be engaged in the notch 31.

In the operation when the engine is moving forward or backward the belt-wheel is to remain idle and the friction-dogs 18 are thrown into tight engagement with the flange of the clutch member 16 by operating the angle-lever 21, moving the collar 20 inward or into engagement with the disk 9, and thus through the medium of the gearing the engine will be driven from the motor. When the engine is stationary and in driving connection through its belt 33 with a threshing-machine or the like, the collar 20 is to be moved toward the pinion 11, thus releasing the frictional engagement of the dogs 18 against the flange of the member 16, and the pin 27 is to be moved into the opening 29. Thus the belt-wheel will be operated from the engine, and the gear connections between the pinion 11 and the gear-wheel 15 will remain idle.

Having thus described my invention, I claim as new and desire to secure by Letters Patent—

1. The combination with a traction-vehicle and a motor thereon, of a crank-shaft having connection with the motor, a disk surrounding the shaft, a pinion carried by said disk, gear connections between said pinion and a wheel of the traction-vehicle, a clutch member rigidly secured to the shaft, friction-dogs mounted to swing on said disk and adapted for engagement with said clutch member, the said clutch member having an opening, a loosely-mounted belt-wheel, and a pin movable through said belt-wheel for engaging in the opening of the clutch member.

2. The combination with an engine and a crank-shaft, of a disk mounted loosely on the crank-shaft, gear connections between said disk and a wheel of the engine, a clutch member rigidly secured to the shaft, clutch devices carried by said disk for engaging with said clutch member, a belt-wheel, a pin for locking said belt-wheel to said clutch member and means for locking said pin in either its inner or outer position.

In testimony whereof I have signed my name to this specification in the presence of two subscribing witnesses.

LORENZO G. DIX.

Witnesses:
  A. S. BLOWERS
  C. R. MASIKER.